Fig. 1
Fig. 2
Fig. 3
Fig. 4

Robinson W. Brown
Isaac O. Gilbert
Philip N. Youtz
INVENTORS

Aug. 14, 1956 R. W. BROWN ET AL 2,758,467
BUILDING APPARATUS
Filed Aug. 12, 1950 8 Sheets-Sheet 2

Robinson W. Brown
Isaac O. Gilbert
Philip N. Youtz
INVENTORS

BY
Browning & Simons
ATTORNEYS

Aug. 14, 1956  R. W. BROWN ET AL  2,758,467
BUILDING APPARATUS

Filed Aug. 12, 1950  8 Sheets-Sheet 8

Robinson W. Brown
Isaac O. Gilbert
Philip N. Youtz
INVENTORS

BY
Browning & Simms

ATTORNEYS

United States Patent Office 2,758,467
Patented Aug. 14, 1956

2,758,467

BUILDING APPARATUS

Robinson W. Brown, San Antonio, Tex., Isaac O. Gilbert, Downey, Calif., and Philip N. Youtz, Yorktown Heights, N. Y., assignors, by mesne assignments, to Philip N. Youtz, Yorktown Heights, N. Y.

Application August 12, 1950, Serial No. 179,024

4 Claims. (Cl. 72—1)

This invention relates in general to building methods and apparatus and has for its general object to provide an improved apparatus and method for erecting buildings, especially adapted for use in constructing buildings having floors and roof made of concrete slabs or the like.

More specifically, it is an object of this invention to provide a method of erecting buildings in which excessive strain on the columns and lifting supports which might be caused by lifting a plurality of floors at once, may be avoided, yet in which it will be unnecessary to form a lower slab while an upper slab is suspended thereabove.

Another object is to provide a method of erecting buildings in which the slabs for roof and floors may be readily cast on top of each other without danger of bonding to each other.

Another object is to provide lifting apparatus in which the upward travel of the slab at each lifting station will be constantly followed up as the slab is lifted and all retrograde movement positively prevented.

Another object is to provide lifting apparatus with means for supporting a workman while adjusting the apparatus during the time the apparatus is on top of a column and before any slab has been raised up high enough to provide a support for a workman working on the apparatus, yet which support will be readily removable to permit a slab to be hoisted to a point adjacent the top of the column.

Another object is to provide a lifting apparatus which may hoist a roof slab and then temporarily suspend it while adjusting the hoisting apparatus or hoisting another lower slab into position.

Another object is to provide a lifting apparatus having a number of lifting units adapted to be separated from each other in use, with means for simultaneously observing the exact amount of travel of each lifting unit.

Another object is to provide a lifting apparatus having a number of lifting units with a central control station at which movements of said units will be individually indicated and from which station said units may be simultaneously controlled and the speeds of operation individually adjusted.

Another object is to provide an element which will serve as a reinforcement, bearing, anchor, guide and support for a slab of concrete whereby the slab may be more readily and safely formed at one level and then hoisted to another.

Another object is to provide a thimble anchor for a threaded member which will permit the threaded member to rock slightly without substantially changing the bearing areas.

Other objects and advantages of this invention will become apparent from the following description taken in connection with the accompanying drawings in which is set forth one embodiment of the invention. It will be understood that this drawing and description are by way of illustration only and not by way of limitation.

Referring now more in detail to the drawings, and particularly to the illustration in Figs. 1 to 4, inclusive, it will be seen that as a first step in carrying out the building method in accordance with this invention there are erected certain upright columns which are to support the upper floors and roof structures, these being illustrated by the numeral 1. Each structural upright column is provided with interconnected broad vertically-disposed load-bearing surfaces as will be presently described.

The floors are then poured or formed successively one on top of the other, the first formed being in most instances the ground floor indicated by the numeral 2 which is placed upon suitable foundations. Next is poured the second floor slab 3 and finally the roof slab 4, it being understood, of course, that more floor slabs may be provided if a higher structure is desired.

Figures 1, 2, 3, 4:
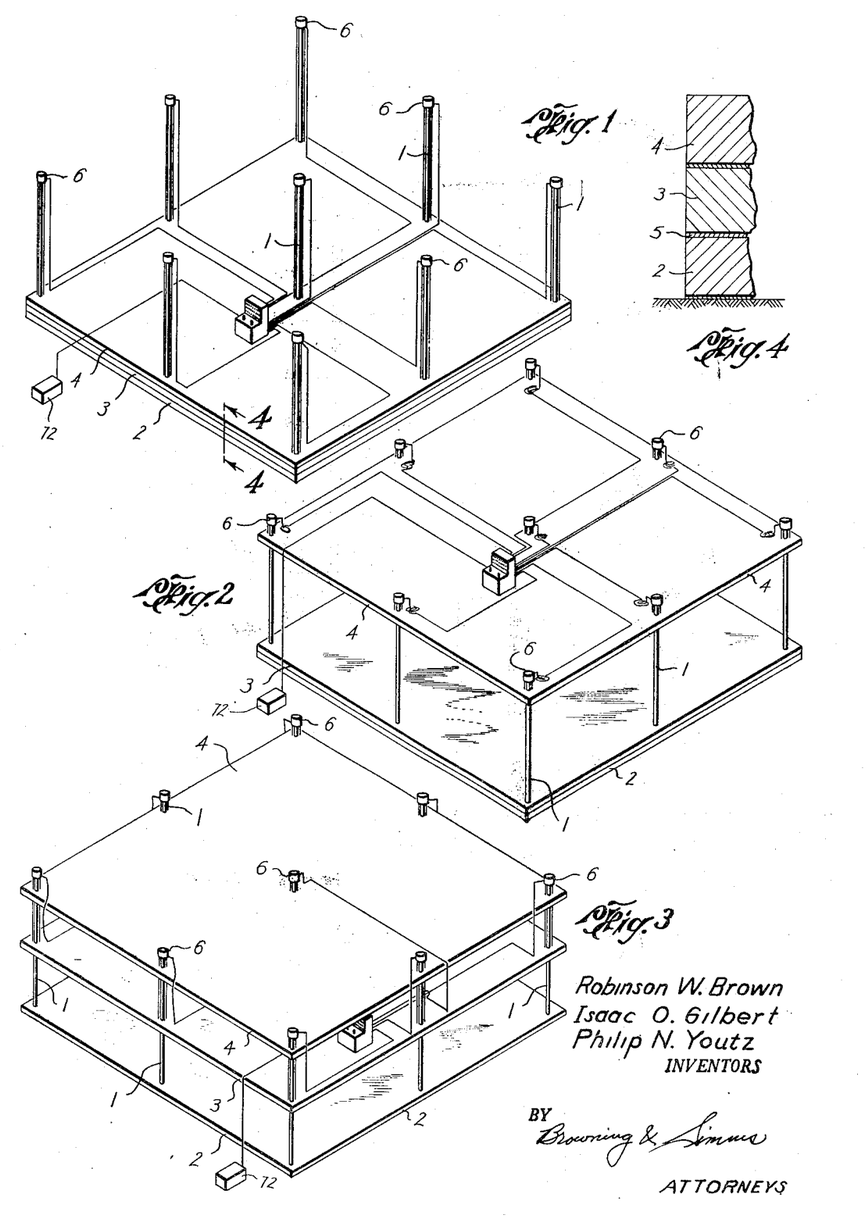
Fig. 1 is a diagrammatic perspective view illustrating the first step in the method in accordance with this invention, wherein slabs later to be hoisted to higher positions are formed one on top of the other adjacent a lower level.
Fig. 2 is a view similar to Fig. 1 but illustrating the same structure after the uppermost slab has been hoisted substantially to its upper position which it will occupy in the finished structure.
Fig. 3 is a view of the same structure illustrated in Figs. 1 and 2, but showing the second floor slab after the same has been hoisted into the position which it will occupy in the finished structure.
Fig. 4 is an enlarged fragmentary view illustrating in cross section the slabs of Fig. 1 resting upon each other, this view being taken along the line 4—4 of Fig. 1.

In connection with the pouring operation it will be seen on reference to Fig. 4 that after the slab 2 has been poured there is placed on top of the same a layer of material 5 which has a slick outer surface that is impervious to the wet concrete so that when the concrete sets it will not stick to this layer. A suitable material for such purpose is a coated or surfaced sheet such as commonly used for synthetic or artificial leather in upholstery and the like.

While it has been noted that all the slabs are formed one on top of the other at one time, or rather before any hoisting is done, it will be seen that in accordance with this invention the lifting of all of such slabs at one time is avoided because of the fact that the unsupported upper ends of the columns might well be of insufficient lateral stability to suspend the weight of all the floors and roof slab before being afforded some lateral bracing. Also, lighter weight lifting equipment is required for lifting one slab at a time than for lifting all slabs at one time. For this reason, one slab, the roof slab first, is raised at a time to the position which it will occupy in the finished structure. The roof slab is indicated as having been raised in Fig. 2 and the second floor slab as having been raised in Fig. 3.

The raising of these slabs is accomplished by means of power units located on top of each of the columns 1 as indicated by the numeral 6, these power units to be described more in detail presently.

Figure 5:
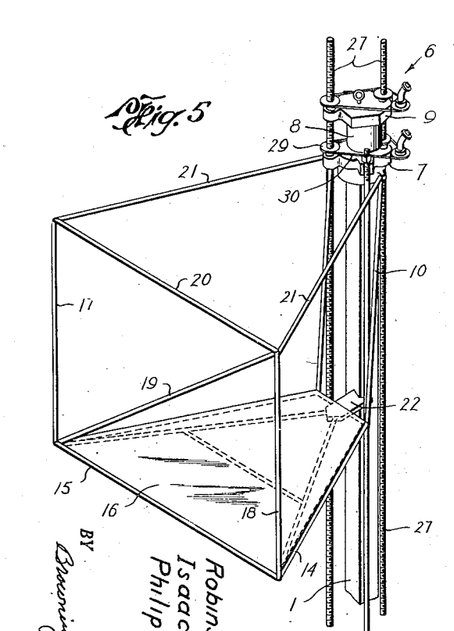
Fig. 5 is a perspective view illustrating one of the units of hoisting apparatus constructed in accordance with this invention in place on a column in position to lift a slab, with the support for supporting a workman in place.

Referring now to Fig. 5, it will be seen that there is mounted on top of the column 1, which is of square cross section, a hoisting unit which comprises a stationary crosshead 7, a hydraulic jack 8, and a movable crosshead 9 on the upper end of the jack.

In Fig. 5, there is shown positioned on one side of the column a support for a workman who might be engaged in adjusting the power unit just referred to, this support comprising a frame having downwardly extending tension rods or members 10 secured at their upper ends to a plate 11 which is in turn removably secured to suitable lugs 12 on the stationary crosshead 7 by means of removable pins 13 threaded into the lugs 12. This frame of the support member also has horizontal supporting parts 14 and 15 on which is carried a platform 16, upright members 17 and 18 with a diagonal brace 19 between them, and rail forming upper horizontal members 20 and 21 which serve to provide a rail around the platform 16 and thereby assist in preventing a workman from falling from the platform. The members 21 are also tied in to the plates 11 as more clearly illustrated in Figs. 7 and 8 so that the entire assembly is firmly though readily removably secured to the stationary crosshead 7 forming a portion of the power unit.

For the purpose of supporting the lower end of this support platform so that it will not interfere with the operation of the lifting rods later to be described, which extend down along the column 1, the edge of the platform 16 which is nearest to the column 1 is provided with a projecting portion 22 which is secured to the platform 16 and bears against the column 1.

As will readily be seen, this platform may be put in position when the power unit is placed on top of the column 1 and may serve the purpose of supporting a workman for adjustments and other operations necessary to be carried on at the power unit, but may be readily removed when a slab is raised by the power unit to the vicinity of the platform 16, so that the slab may then be raised substantially to the upper end of the column 1.

Figure 6:
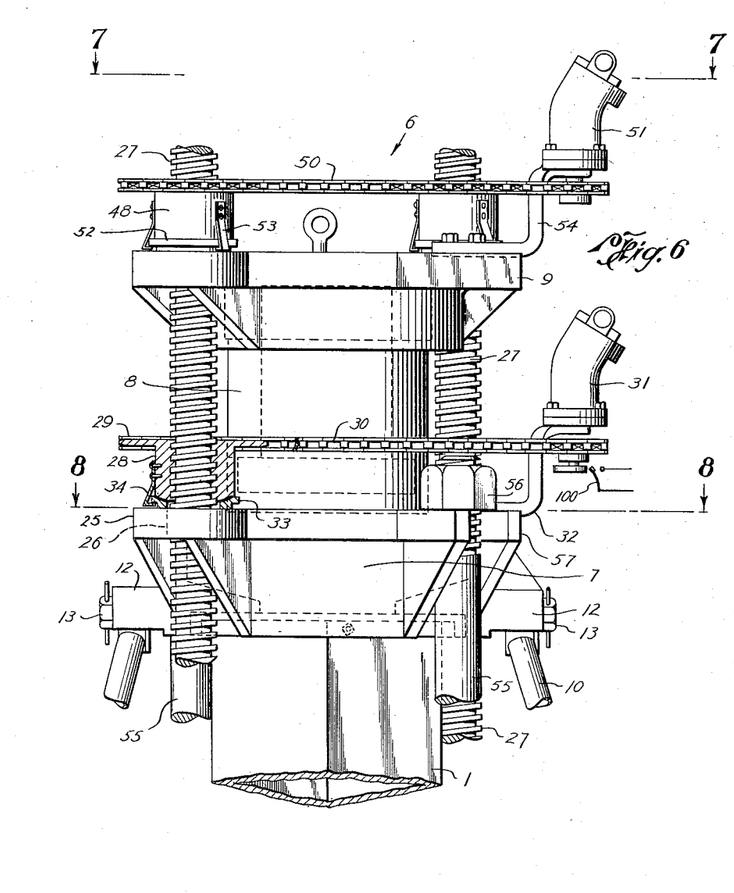
Fig. 6 is a fragmentary view of the upper end portion of a column on which is mounted a lifting apparatus constructed in accordance with this invention, this view being on an enlarged scale with respect to the showing in Fig. 5.
Figure 8:
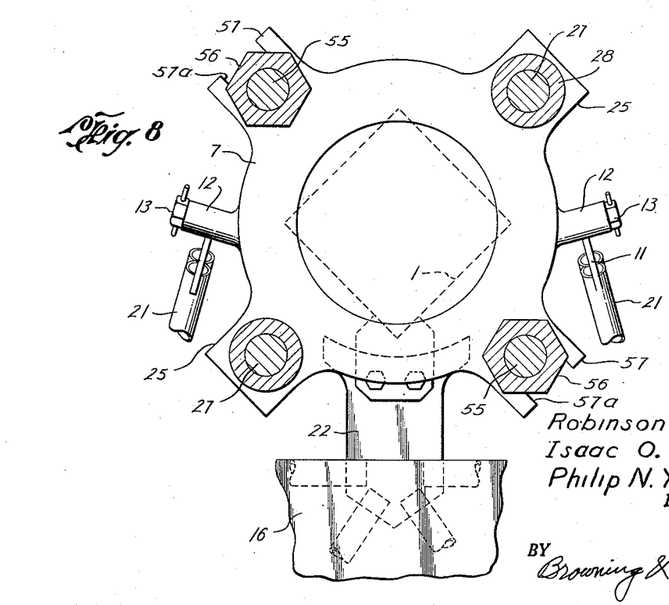
Fig. 8 is a view taken on a horizontal plane along the line 8—8 of Fig. 6.
Figures 9, 12:
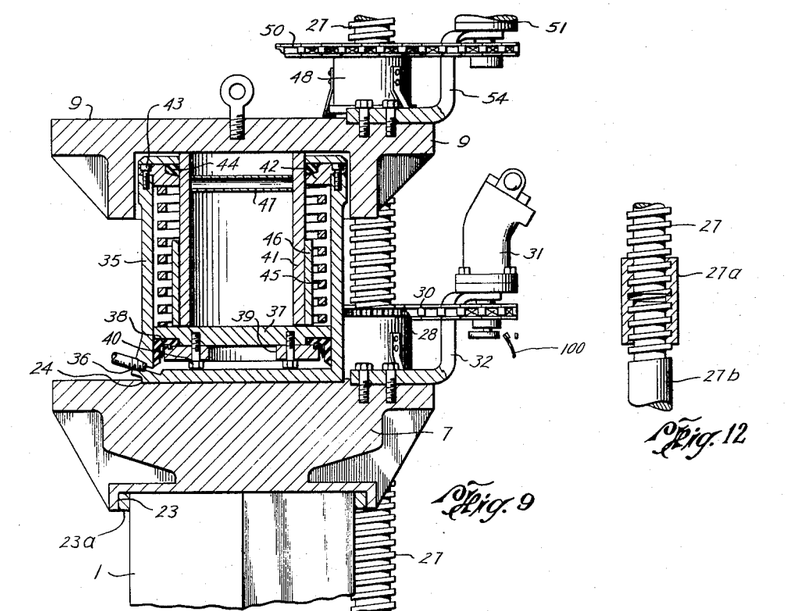
Fig. 9 is a view similar to Fig. 6 but showing the jack and certain other parts in vertical cross section, and with the jack in its contracted or retracted position ready to start upward on a power stroke.
Fig. 12 is a view in longitudinal cross section through a splice between two sections of lifting rod illustrating the manner of joining such sections together.
Figure 10:
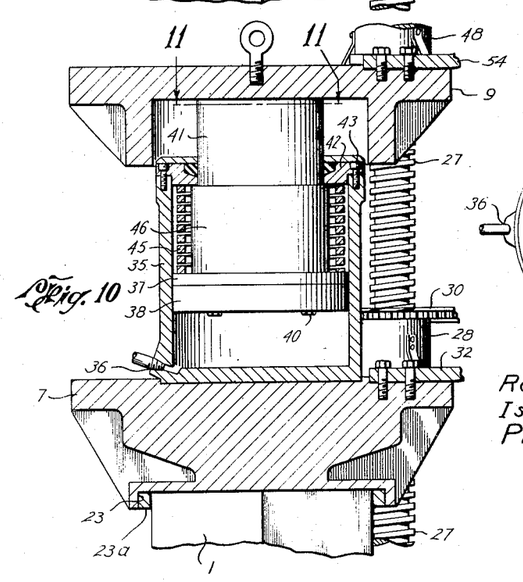
Fig. 10 is a view similar to Fig. 9 but showing the parts in the position they occupy at the end of a power stroke with the jack extended.
Figure 11:
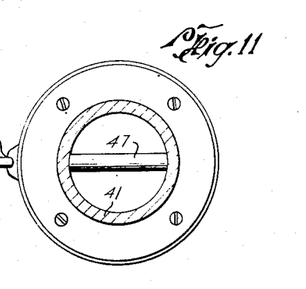
Fig. 11 is a horizontal cross section taken along the line 11—11 of Fig. 10.

The stationary crosshead 7 appears more in detail in Figs. 6 and 8, and to some extent in Fig. 9. It consists of a body having a lower surface which in this instance has a socket-like portion adapted to receive the upper end of the column 1 and prevent lateral displacement of the crosshead with respect to the upper end of the column, all as indicated by the numeral 23 (Figure 10). A column adapter 23a may be employed to accommodate the socket in the lower surface of the recess to a column of a different shape.

On its opposite or upper surface this crosshead is provided with a shallow socket or receptacle 24 for receiving the lower end portion of the hydraulic jack 8.

On two opposite sides this crosshead is provided with lugs 25 projecting laterally therefrom and having holes 26 therethrough, through which are adapted to pass lifting rods 27 which are preferably threaded throughout their length and the function of which will be more apparent from the following description. It may be noted, however, that these lifting rods are provided above the stationary crosshead 7 with nuts 28 threaded thereon, each of which nuts is provided with a sprocket 29 about which passes a chain 30 adapted to be driven by any suitable device which will apply a constant torque or tension on these nuts tending to tighten them toward the crosshead 7. In the instance illustrated the chain 30 is shown as being driven by a constant torque hydraulic motor 31 mounted on a bracket 32, which is in turn carried by the crosshead 7.

The nuts 28 preferably do not bear directly upon the body of the crosshead 7 but rather on thrust bearing washers 33 (Figure 6), which in turn seat upon the metal of the crosshead 7. These washers 33 may be rotatably secured to the nuts 28 by means of suitable retaining clips 34. Preferably the holes for receiving the lifting rods 27 and permitting them to pass through the crosshead 7 are of such size as to pass these lifting rods with considerable clearance, and bearing surfaces between the nuts 28 and the washers 33 are made spherical so that considerable swinging or rocking may take place between the lifting rods and the crosshead without substantially disturbing the bearing between the nuts and their washers.

The hydraulic jack which is shown seated upon the upper surface of the crosshead in the socket provided therefor, is illustrated more in detail in Figs. 9 and 10 and consists of a cylinder 35 having an opening 36 adjacent its lower end for the reception of power fluid. Disposed within this cylinder 35 is a piston 37 having a lip-type packing 38 secured to its lower surface by means of a suitable washer 39 and bolts 40. Thus, power fluid admitted through the opening 36 will tend to force this piston 37 upwardly.

Extending upwardly from the upper surface of the piston 37 is a sleeve-like member 41 the upper end of which is adapted to bear against the recessed surface of the crosshead 9, so that when the piston 37 is forced upwardly, the crosshead 9 will be forced upwardly along with it.

The sleeve 41 is guided in its upward movement by means of a cylinder head 42 secured by means of cap screws 43 or the like to the upper end of the cylinder 35 and having an opening through its central portion of a size to receive and guide the sleeve 41. If desired, a suitable dust guard 44 may be carried by this cylinder head for the purpose of preventing any substantial seepage of dust into the space about the sleeve 41. The piston 37 is normally urged downwardly by means of a spring 45, which is disposed between the upper surface of the piston 37 and the lower surface of the cylinder head 42 and within the annular space between the cylinder 35 and the sleeve 41. Upward movement of the piston is limited by means of a sleeve or insert 46 which is likewise inserted into this annular space immediately next to the sleeve 41. It will be appreciated that the exact extent of travel of the piston 37 may be determined by the length of this sleeve 46 and may be adjusted by replacing the sleeve 46 with another sleeve of different length.

It will be seen that adjacent its upper end the sleeve 41 is provided with a tube or bar 47 extending diagonally across its interior. The purpose of this tube or bar is merely that of providing a handle for use in lifting the sleeve 41 and its appended parts whenever it is desired to move the jack or disassemble the device.

It will be appreciated that while a hydraulic jack has been illustrated and described, some other form of jack might be employed in its place.

The crosshead 9 is provided with oppositely extending lugs in which are formed holes registering with the holes 26 in the crosshead 7 for the purpose of receiving the upper end portions of the lifting rods 27. By reference to Figs. 6 and 7 it will be seen that these lifting rods 27 have threaded onto them above the crosshead 9 lifting nuts 48 which are similar in all respects to the holding nuts 28 and which have sprockets 49 integral therewith and adapted to be driven by an endless chain 50 in the same manner that the holding nuts 28 are driven by the endless chain 30. Likewise, also, this chain 50 is driven by a means adapted to provide a constant tension on the lifting nuts 48 tending to thread these nuts tight down on top of the crosshead 9. The motor for providing the constant tension on the chain 50 is in the instance illustrated a continuous torque hydraulic motor 51.

Figure 7:
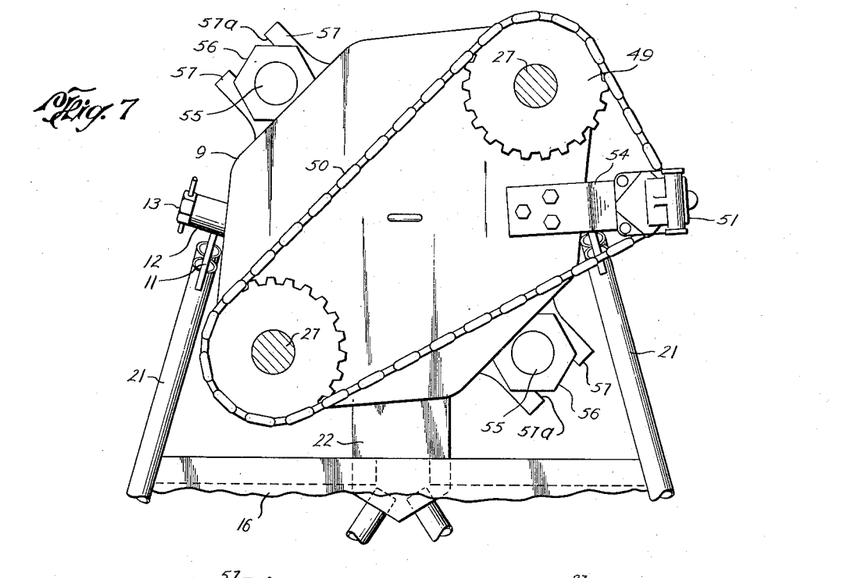
Fig. 7 is a view partly in horizontal cross section and partly in plan illustrating the structure shown in Fig. 6, and being taken along the line 7—7 of Fig. 6.

As in the case of the holding nuts 28, the lifting nuts 48 do not bear directly upon the material of the crosshead 9 but rather upon bearing washers 52 which in turn rest upon the material of the crosshead 9. These bearing washers 52 are held against the lifting nuts 48 by means of clips 53 which permit the relative rotation between the lifting nuts 48 and the washers 52. The surface of contact between the lifting nuts 48 and the washers 52 is preferably spherical the same as between the holding nuts 28 and the washers 33, and for the same purpose. The continuous torque motor 51 is mounted by means of a bracket 54 upon the crosshead 9.

From the foregoing it will be seen that when power fluid is admitted through the opening 36 into the cylinder 35 below the piston 37, this piston will be forced upwardly against the tension of the spring 45 and will cause the crosshead 9 to move upwardly until the sleeve 46 comes in contact with the cylinder head 42. During this upward movement, the force transmitted to the crosshead 9 will be in turn transmitted through the bearing washers 52 and lifting nuts 48 to the lifting rods 27 and due to the friction thus set up between the washers 52 and the lifting nuts 48 as well as between the lifting nuts 48 and the lifting rods 27, the lifting nuts 48 will be prevented from turning with respect to the lifting rods 27. The lifting rods 27 will therefore be pulled upwardly, but as they are pulled upwardly and tension or stress relieved from the nuts 28 and washers 33, the continuous torque motor 31 will act through the chain 30 to rotate the nuts 28 and cause them to take up the movement of the lifting rods 27 as fast as the rods move upwardly. Thus, these holding nuts 28 and the arrangement described will serve positively to prevent any retrograde movement of the lifting rods 27.

Now when the power fluid is released from the cylinder through the opening 36, the spring 45 taken with the weight of the piston 37, the sleeve 41, and the crosshead 9 will tend to move the piston 37 downwardly along with the other parts referred to. As this downward movement takes place, the action of the continuous torque motor 51 acting through the chain 50 will cause rotation of the nuts 48 so as to keep them snugged up tightly against the washers 52 on the crosshead 9. Thus, immediately after the piston 37 has been returned to its lowermost position power fluid may again be admitted to the cylinder 35 to raise this piston and the crosshead 9 together with the lifting rods 27 repeating the operation. During downward movement of the crosshead 9 it will be appreciated that the great force of the tension on the pull rods being transmitted through the holding nuts 28 and washers 33 directly to the crosshead 7 will prevent rotation of the holding nuts 28, and despite the fact that continuous torque is maintained on these nuts by the motor 31, the nuts will not rotate until the hydraulic jack again begins its power stroke to lift the crosshead 9 and the lifting rods 27.

Now, if during the lifting operation in connection with a slab it be found necessary to release the tension on the lifting rods for the purpose of making any adjustments or repairs on the lifting equipment, or for the purpose of securing the lifting rods to another lower slab and lifting the same while holding the slab already lifted in its upper position, this may be accomplished through the medium of transfer rods 55 which are received in notches 57a in lugs 57 on the outer periphery of the crosshead 7, these lugs and notches being disposed intermediate the lugs 25 and preferably directly opposite each other on opposite sides of the crosshead 7. These transfer rods 55 are preferably threaded on their upper ends to receive nuts 56 which bear against the lugs 57 on the crosshead to prevent downward movement of the rods 55. The lower ends of the rods 55 may be secured to the load which they are to suspend by means which will presently be described.

In the event it becomes necessary to secure more than one length of lifting rod to the lifting apparatus above described, two or more lengths of lifting rod may be secured together by means of a coupling 27a as illustrated in Fig. 12. In such event extension lifting rods 27b threaded only at their ends may be used.

For the purpose of making possible the efficient securing of the lifting rods 27 and transfer rods 55 to the slabs to be lifted, and for the purpose of providing for these slabs bearings around the columns 1 and reinforcing means for receiving parts by which the slabs may be supported on the columns once they are raised to their ultimate position thereon, there are provided what may be termed lifting collars illustrated in Figs. 13 to 17, inclusive.

Figure 13:
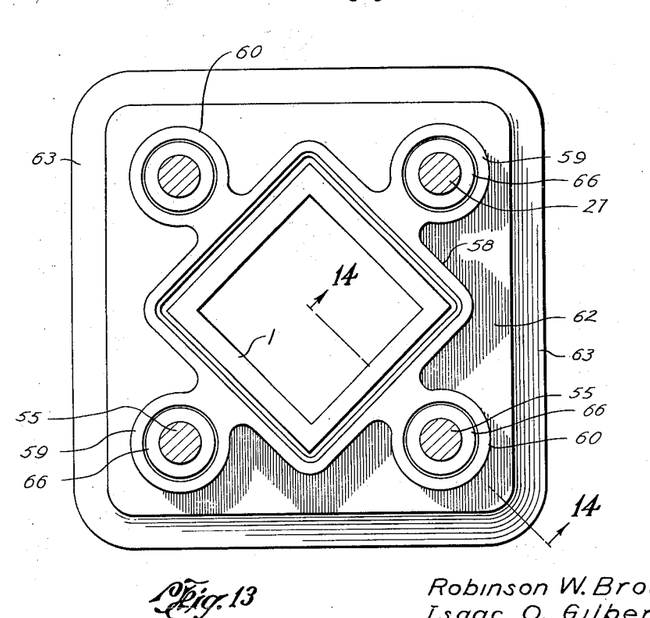
Fig. 13 is a plan view of a lifting collar such as incorporated into one of the upper of the slabs to be lifted for the purpose of reinforcing and lifting the same in accordance with this invention.
Figure 14:
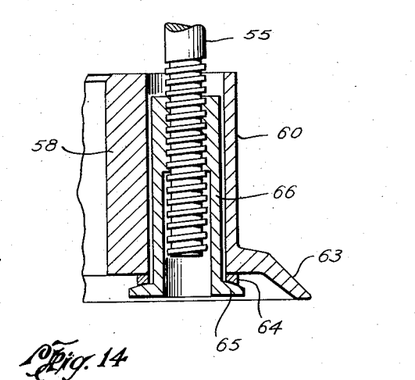
Fig. 14 is a view taken along the line 14—14 of Fig. 13 and illustrating the manner in which a transfer or extension lifting rod may be anchored in the appropriate tubular opening of the collar shown in Fig. 13.

The lifting collar illustrated in Figs. 13 and 14 is particularly adapted for use in a roof or floor slab which is not the lowermost of the slabs to be raised in constructing the building. This collar consists of a tubular bearing portion 58 and tubular anchor and guide members 59 on opposite sides of the tubular bearing portion 58, together with tubular anchor and guide portions 60 on the two other sides of the tubular bearing portion 58. Surrounding all these tubular bearing portions and integral therewith and extending laterally therefrom adjacent one end of all of the tubular portions, is a flange 62 which serves to maintain the tubular portions in their proper relation to each other and to provide a plate anchor therefor within the slab to be raised.

Surrounding the bearing and guide tubular portions and depending from the flange 62 is a skirt portion 63 which extends from the flange in a direction opposite to that in which the tubular portions extend from the flange. This skirt is preferably along the marginal outer portion of the flange 62 and serves to space the flange 62 from a support upon which the collar may be resting during the pouring of concrete around it. The entire collar is of such vertical dimensions as to extend entirely through the slab thus to be poured.

It will be appreciated that whereas the bearing portion 58 has been referred to as a tubular portion, it may be square in cross section or round in cross section, or even of some other shape depending upon the cross sectional shape of the column about which it is to be placed. It is intended that the word "tubular" shall cover such various shapes.

The presence of the depending flange 63 serves to maintain a space underneath the collar which is free from concrete after the pouring operation and which will provide a space for the reception of the bearing washer 64 and of the head 65 of the thimble 66 which extends upwardly into the tubular guide portion 60 and is internally threaded to receive either the transfer rod 55 or the lifting rod 27 or 27b. This space within the flange 63 as the collar rests on a flat surface prior to and during the pouring operation involved in forming a slab about the collar, makes it possible to place the washer 64 and thimble 65 in position before the pouring operation so that after the pouring operation has been completed and the slab has set the lifting rods 27 or 27b may be secured thereto by merely threading them into place from above.

It is to be noted that the surface of bearing between the washer 64 and the head 65 of the thimble 66 is a spherical surface so that the thimble may rock with respect to the washer 64 without substantially changing the bearing area and to prevent binding of the parts in case of any misalignment. This rocking is further permitted by a relatively loose fit of thimbles 66 within the tubular guides 59 and 60.

The space left within the confines of the depending flange 63 will likewise be available for the securing of a bracket as by welding or otherwise to the collar on its under side, by means of which bracket the collar and the slab which carries it may be permanently secured to the column. After the slab has thus been permanently secured to the column the space within the depending flange 63 may be filled with cement or other material so as to cover the metal of the collar and comply with fire regulations.

Figure 15:
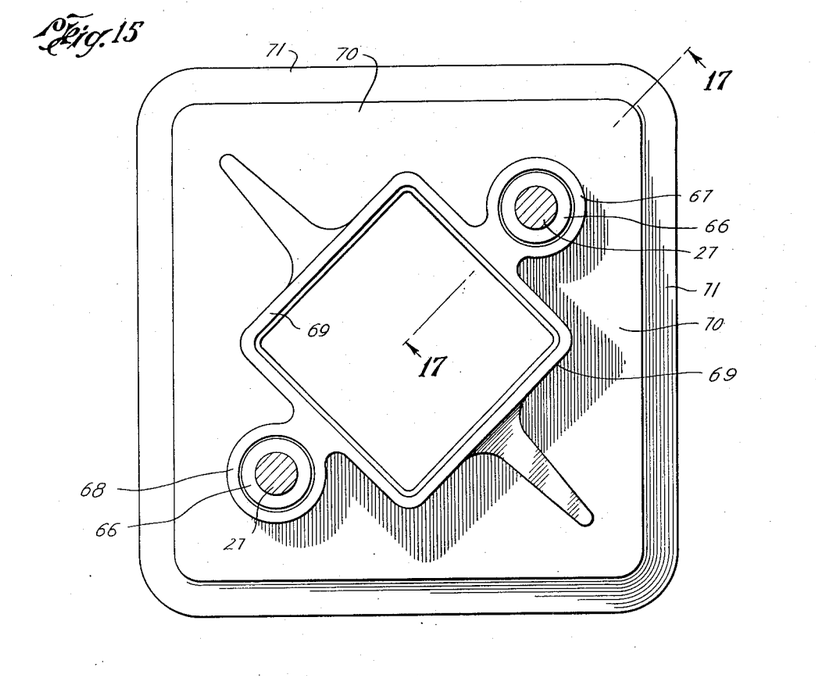
Fig. 15 is a view similar to Fig. 13 but showing the lifting collar which is intended for use in connection with the lowest slab to be lifted, and which may be made with a larger flange area to support a greater load.
Figure 16:
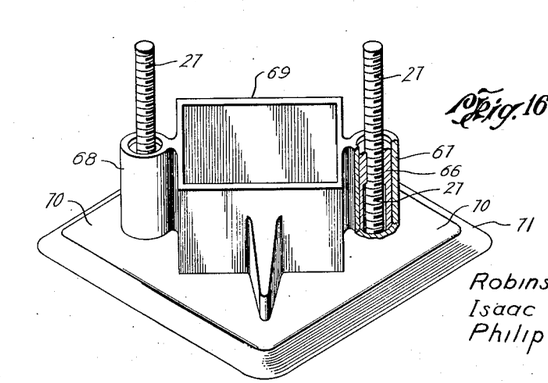
Fig. 16 is a perspective view of the collar illustrated in Fig. 15 showing the manner in which primary lifting rods are secured to the lifting collar.
Figure 17:
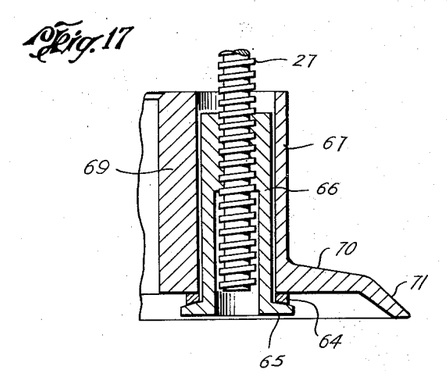
Fig. 17 is a view similar to Fig. 14 but taken along the line 17—17 of Fig. 15 and further illustrating the manner in which a primary lifting rod is secured to a lifting collar.

The collar illustrated in Figs. 15, 16 and 17 is substantially the same as that illustrated in Figs. 13 and 14 except that it has only two guide openings 67 and 68 on opposite sides of the tubular bearing member 69. The flange 70 is in all respects identical to the flange 62 of Fig. 13 and has the same purpose, as does also the depending flange 71 have the same purpose and configuration as the depending flange 63 in Fig. 13.

This form of collar as illustrated in Figs. 15, 16 and 17 is adapted to be employed in the lowermost of the slabs to be raised where there is no requirement for a transfer rod such as is adapted to be received within the tubular anchor portions 59 or 60. The lifting rods 27 may be anchored in the tubular anchor portions 67 and 68 in the manner shown in Fig. 17 which is identical with that shown in Fig. 14 for the anchoring of the holding rods 55. Inasmuch as the bearing washer and thimble illustrated in Fig. 17 are identical with those shown in Fig. 14, they are being given the same reference characters and no further description thereof or of their function is believed necessary.

Figure 18:
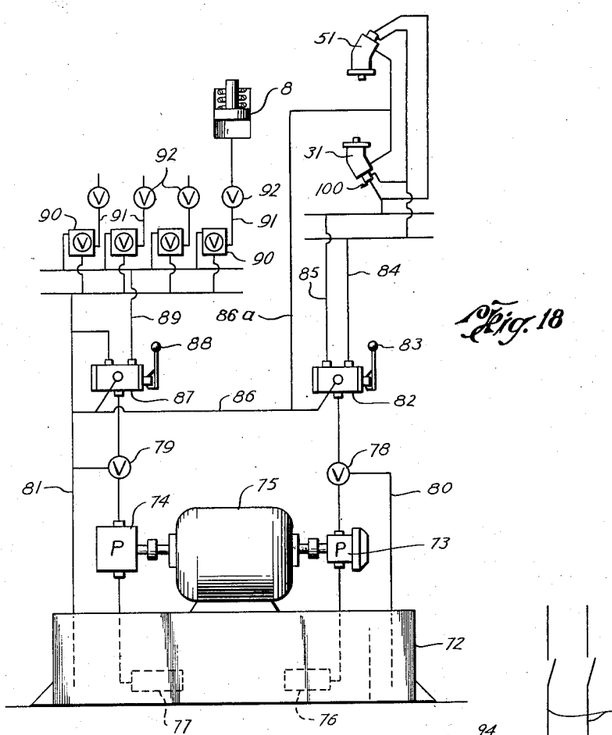
Fig. 18 is a diagrammatic view illustrating the hydraulic power circuit employed in the preferred embodiment of this invention.

Referring now to Fig. 18 in which the hydraulic system forming part of this invention is illustrated diagrammatically, it will be seen that there is a reservoir 72 for hydraulic fluid, from which reservoir this fluid is pumped by means of pumps 73 and 74 driven by some suitable means such as an electric motor 75. Suitable screens may be provided on the intake ends of the suction lines from these pumps as indicated at 76 and 77. In the outlet lines from these pumps there are provided relief valves 78 and 79 which, in the event of the pressure in these lines should rise above a predetermined maximum, will serve to release pressure fluid back into the tank 72 through the lines 80 and 81 respectively.

The line from the pump 73 leads to a master control valve 82 adapted to be actuated by a control lever 83 or by some other suitable means so as to direct the power fluid through the line 84 to the motors 31 and 51 to urge them to rotate in one direction. When in such position, exhaust fluid from the motors 31 and 51 will be permitted to flow back through a line 85, through the valve 82, and through a line 86 and the line 81 into the tank 72. The lever 83 may be shifted to its other extreme position to force the power fluid through the line 85 to the motors 31 and 51 so as to rotate them in the opposite direction, in which event the return fluid comes through the line 84 and the lines 86 and 81 to the tank 72. When in an intermediate position the lever 83 prevents the flow of power fluid from the pump 73 to the motors 31 and 51. Line 86a is provided to return leakage of motors 31 and 51 to the line 86.

The power line from the pump 74 leads to a master control valve 87 which may be similar in all respects to the valve 82, and which has a handle 88 movable to one extreme position to supply power fluid through a line 89 to the intakes of a series of metering valves 90, one of these valves being supplied for each of the hydraulic jacks 8. These metering valves may be operated so as to turn the power fluid from the line 89 into the line 91 leading from each of the valves 90.

Each of the lines 91 leads to a shut-off valve 92 through which fluid must pass on its way to each of the hydraulic jacks 8 respectively.

Thus, it will be seen that the valve 87 may be operated to admit power fluid through the valves 90 and the lines 91 and valves 92 into the hydraulic jacks 8 to cause them to move on their power stroke, and also operated so as to vent the power fluid from each of the hydraulic jacks 8 and permit them to retract. Thus, the valve 87 may serve to actuate all of the hydraulic jacks simultaneously.

The valves 92 may be operated in a similar fashion so as to actuate or shut off so that there will be no actuation of any selected one or more of the hydraulic jacks 8.

The valves 90 may serve the purpose of regulating the speed of operation of the hydraulic jacks 8 by metering the amount of fluid flowing to each of these jacks. In the event it should be observed that one of the jacks is moving faster than the others, it may be slowed up by manipulation of its corresponding valve 90, or by the same token if it should be found that it is moving too slowly it may be speeded up in the same fashion.

Figure 19:
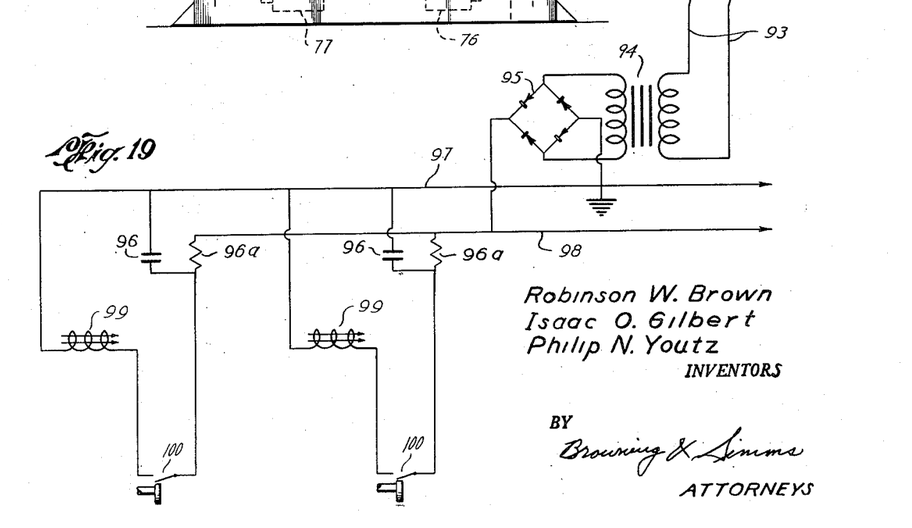
Fig. 19 is a diagrammatic view illustrating the electrical circuit employed in the preferred embodiment for the purpose of indicating the extent of movement of the various jacks of the apparatus.
Figure 20:
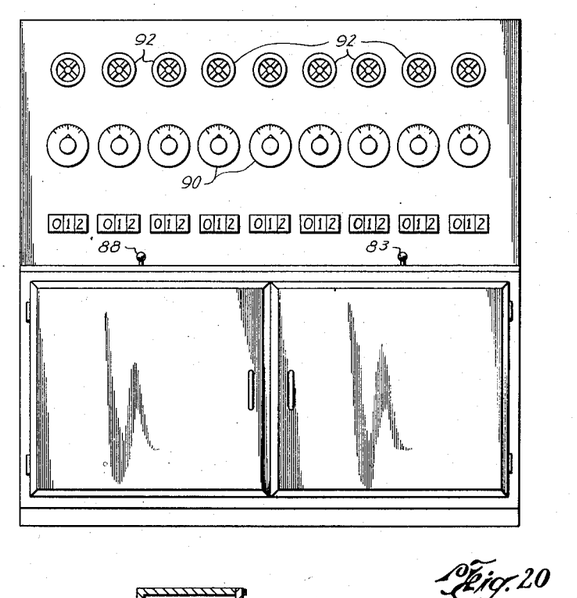
Fig. 20 is a front elevational view illustrating the central operating cabinet shown on the roof slabs in Figs. 1, 2 and 3.
Figure 21:
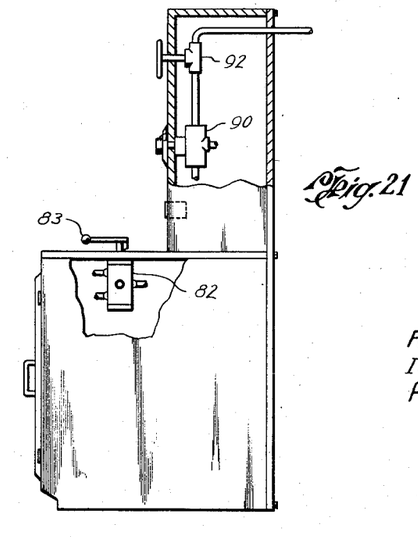
Fig. 21 is a side or end elevational view of the cabinet shown in Fig. 20.

In Fig. 19 is illustrated one manner of providing power for the operation of a device for indicating the extent of movement of each of the hydraulic jacks. In the form illustrated the power input may be from an alternating current source through lines 93 to a transformer 94. From this transformer 94 current is taken to a rectifier 95, one side of which is grounded and connected with a line 97 and the other side of which is connected to a line 98. Condensers 96 and resistors 96a, one each of which are provided for each of the hydraulic jacks 8, are connected across the lines 97 and 98 which serve to charge up the condensers to the supply voltage. Solenoids 99 in series with switches 100 are connected across the condensers 96. These solenoids 99 are the activators for the counters adapted to count certain increments of movement of the hydraulic jacks 8. A switch 100, operated by a cam on the shaft of motor 31, serves to discharge the condenser 96 through the solenoid 99 providing a short duration surge of energy to operate the solenoid. When switch 100 is closed, condenser 96 will not recharge due to the voltage drop across resistor 96a as the resistance of the solenoid 99 is much less than that of the resistor 96a. Should the supply voltage 93 be cut off while the switch 100 is closed and then again be turned on, this event will not cause the solenoid 99 to operate since the condenser 96 will not charge up. This particular circuit is provided to prevent a false count being recorded. When switch 100 is open, condenser 96 will charge to full D. C. supply voltage through resistor 96a, the time constant of this R. C. network being chosen to be considerably less than the maximum operating frequency of the counting cycle. Since a given increment of rotation of nut 28 indicates a given increment of vertical movement of the jack 8 and since the nuts 28 are positively driven by the motor 31, then the switch 100, actuated by a cam on the shift of motor 31, will indicate a definite vertical movement of the jack 8 each time it closes its circuit to actuate the solenoid 99 and operate the counter.

Preferably, and in accordance with the spirit of this invention, the lifting units hereinbefore described will be mounted on each of the respective columns by which a roof or floor slab is to be lifted, and connected by hydraulic lines with a central station at which station all controls and indications will be located. At this station, in addition to the master control valves 82 and 87, will be located the cutoff valves 92 and the metering valves 90 so that an operator at one position can carry out all of these operations. Furthermore, at this one central station will be located the solenoid operated counters operated by the solenoids 99 so that an operator by means of these counters or indicators can tell at a glance and simultaneously the exact position of all of the jacks and the exact amount which each has advanced. In the event it should be apparent that one jack is moving ahead of the others by an amount which is too great to be safe under the additional stresses that would be placed upon the slab under such conditions, the operator has but to tighten down on the metering valve 90 corresponding to that jack and thereby slow up the operation of that jack until the others can catch up. In like fashion he could speed up its operation if it were going too slow as shown by the indicators operated by the solenoids 99.

From the foregoing it will be seen that a means has been provided for carrying out and accomplishing all of the objects and advantages sought by this invention.

The invention having been described, what is claimed is:

1. A hoisting apparatus for lifting vertically a substantially horizontal building slab from a lower to a higher level in a building which comprises, in combination: a plurality of substantially vertical support columns for said building secured at their lowermost ends to a foundation support, each of said vertical columns comprising a single structural unit having spaced, vertically-disposed broad interconnected load-bearing surfaces, at least one monolithic concrete slab cast over said foundation support and having an opening at each of said vertical supporting columns with the vertical faces of said slab at each said opening disposed in slidable, bearing relation with the said broad, vertically-disposed load-bearing surfaces of said support columns; and a lifting assembly for raising said slab to an upper level of said vertical support columns, including a jack mounted on a stationary crosshead secured on top of each of a plurality of said vertical support columns, at least one threaded lifting rod for and depending from each jack and detachably secured to said slab, a movable crosshead mounted above said jack for vertical movement with said jack on the power stroke thereof, a lifting nut screw-threaded on each lifting rod above said movable crosshead transmitting to the lifting rod the lifting force of the jack, each lifting rod passing freely through an aperture in said stationary crosshead, a holding nut screw-threaded to each lifting rod and supported on the corresponding stationary crosshead, each of said lifting nuts and holding nuts having a spherically-shaped bearing surface disposed on the under-surface of the nut in engagement with a complementary upwardly facing spherically-shaped surface on the respective crosshead therebeneath, said holding nut being free for downward movement on said lifting rod as the rod is moved upwardly through said stationary crosshead during the lifting stroke of said jack, said lifting nut being free for downward movement on said lifting rod as the movable crosshead is lowered between power strokes of said jack, power means exerting a constant torque on each of said nuts tending to tighten that nut against the crosshead therebeneath and maintaining said spherically-shaped surfaces of the respective nuts and crossheads in substantially continuous contact, each said holding nut cooperating with the corresponding stationary crosshead to hold the lifting rod against retrograde movement, the bearing relation between the vertical faces of said openings in said slab around said vertical support columns in load-transmitting relation with the vertically-disposed load-bearing surfaces thereof preventing sidesway of said slab during its ascent, and the spherically-shaped bearing surfaces permitting angular disposition of said nuts with respect to the horizontal supporting surfaces therefor.

2. The lifting apparatus of claim 1 in which said vertical support columns have parallel surfaces and where there are at least two lifting rods for each jack, said lifting rods being symmetrically disposed with respect to each other and with respect to said column adjacent thereto.

3. The lifting apparatus of claim 1 including means indicating the rate of lift of each individual jack at a central location, in units of measurement on the order of thousandths of an inch, and control means at said central location providing a centralized control over the rate of lift of each individual jack.

4. The lifting apparatus of claim 1, said jacks being hydraulic jacks, and means indicating the rate of lift of each individual hydraulic jack at a central location in units of measurement on the order of thousandths of an inch, and control valves located at said central location on the hydraulic line of each individual jack, thereby providing centralized control over the rate of lift of each individual jack.

References Cited in the file of this patent

UNITED STATES PATENTS

| | | |
|---|---|---|
| 216,326 | Hyde | June 10, 1879 |
| 991,517 | Kennedy | May 9, 1911 |
| 1,066,436 | Peltzer | July 1, 1913 |
| 1,352,918 | Rohbock | Sept. 14, 1920 |
| 1,836,962 | Goldman | Dec. 15, 1931 |
| 2,181,740 | Reiland | Nov. 28, 1939 |
| 2,260,051 | Pardee | Oct. 21, 1941 |
| 2,310,930 | Blanchett | Feb. 16, 1943 |
| 2,333,274 | Scannell | Nov. 2, 1943 |
| 2,430,100 | Brumder et al. | Nov. 4, 1947 |
| 2,540,679 | Laffaille | Feb. 6, 1951 |

FOREIGN PATENTS

| | | |
|---|---|---|
| 658,203 | France | of 1929 |
| 613,403 | Great Britain | Nov. 25, 1948 |